United States Patent
Nielsen et al.

(10) Patent No.: US 7,339,950 B2
(45) Date of Patent: Mar. 4, 2008

(54) ALLOCATION OF RADIO RESOURCES TO RADIO BEARERS

(75) Inventors: Lars Nielsen, Aalborg (DK); Klaus Ingeman Pedersen, Aalborg (DK)

(73) Assignee: Nokia Corporation, Espoo (FI)

( * ) Notice: Subject to any disclaimer, the term of this patent is extended or adjusted under 35 U.S.C. 154(b) by 881 days.

(21) Appl. No.: 10/362,632

(22) PCT Filed: Jun. 29, 2001

(86) PCT No.: PCT/EP01/07473
§ 371 (c)(1),
(2), (4) Date: May 22, 2003

(87) PCT Pub. No.: WO03/005751
PCT Pub. Date: Jan. 16, 2003

(65) Prior Publication Data
US 2004/0042394 A1    Mar. 4, 2004

(51) Int. Cl.
*H04J 3/16* (2006.01)
(52) U.S. Cl. .................................. 370/468; 370/252
(58) Field of Classification Search ........... 370/252, 370/329, 332, 342, 431, 437, 441, 449, 450, 370/229, 230, 230.1, 231, 235, 235.1, 236, 370/236.1, 254, 255, 253, 465, 468; 375/240, 375/240.02; 455/450, 452.1, 452.2, 453
See application file for complete search history.

(56) References Cited

U.S. PATENT DOCUMENTS 5,838,671 A    11/1998   Ishikawa et al.
6,456,844 B1 *  9/2002   Parantainen et al. ........ 455/423
6,842,428 B2 *  1/2005   Chen et al. .................. 370/252
6,928,268 B1 *  8/2005   Kroner ........................ 455/69

(Continued)

FOREIGN PATENT DOCUMENTS

EP    1 087 633 A1    3/2001

(Continued)

OTHER PUBLICATIONS

"3rd Generation Partnership Project; Technical Specification Group Radio Access Network; Radio resource management strategies" 3GPP TR 25.922 V3.5.0 (Mar. 2001), Technical Report, Release 1999, pp. 1-70.

*Primary Examiner*—Ricky Q. Ngo
*Assistant Examiner*—Pao Sinkantarakorn
(74) *Attorney, Agent, or Firm*—Squire, Sanders & Dempsey L.L.P.

(57) ABSTRACT

The invention relates to a method, a module and an algorithm for allocating radio resources to a plurality of radio bearers in a wireless communications network. In order to improve the allocation of resources, first the current activity status 21,22 is determined for each radio bearer and/or for each set of radio bearers of at least a selected group of radio bearers and/or of sets of radio bearers. Then, based on the probability p,q with which each radio bearer and/or set of selected group will change its current activity status 21,22, a value is determined which is indicative of the probability of outage. Finally, it is decided based on a comparison of the determined value indicative of the probability of outage with a predetermined threshold value whether the current allocation of radio resources will be changed. The invention equally relates to a wireless access network comprising a corresponding module.

28 Claims, 3 Drawing Sheets

U.S. PATENT DOCUMENTS

| | | | |
|---|---|---|---|
| 6,944,460 B2 * | 9/2005 | Haartsen | 455/452.2 |
| 6,963,544 B1 * | 11/2005 | Balachandran et al. | 370/281 |
| 7,046,678 B2 * | 5/2006 | Jiang et al. | 370/395.41 |
| 2002/0009134 A1 * | 1/2002 | Fischel et al. | 375/224 |
| 2002/0052206 A1 * | 5/2002 | Longoni | 455/453 |

FOREIGN PATENT DOCUMENTS

| | | |
|---|---|---|
| EP | 1 100 283 A1 | 5/2001 |
| EP | 1 126 734 A1 | 8/2001 |

* cited by examiner

ALLOCATION OF RADIO RESOURCES TO RADIO BEARERS

PRIORITY CLAIM

This is a U.S. national stage of application No. PCT/EP01/07473, filed on Jun. 29, 2001. Priority is claimed on that application.

FIELD OF THE INVENTION

The invention relates to a method for allocating radio resources to a plurality of radio bearers in a wireless communications network. The invention equally relates to a module and an algorithm realizing such a method, and to a wireless access network comprising such a module.

BACKGROUND OF THE INVENTION

The allocation of radio resources to radio bearers employed in a wireless communications network is of particular relevance in packet switched networks.

Wideband Code Division Multiple Access (WCDMA) radio access networks (RAN), for example, comprise a dedicated packet scheduling (PS) module as part of a radio resource management (RRM). This module includes a packet scheduling, algorithm which is responsible for allocating radio resources to the radio bearers.

The 'packet scheduling' algorithm calls at regular intervals referred to as capacity grant period-an algorithm for modifying the current bitrate. This 'bitrate modification' algorithm is designed to maximize the utilization of the network while at the same time maintaining its stability.

FIG. 1 is a flow chart illustrating a possible implementation of a power-based 'bitrate modification' algorithm.

As a first step, the 'bitrate modification' algorithm is activated at the beginning of a new capacity grant period. The current total power $P_{current}$ used by the radio bearers is provided as a parameter to the algorithm. The algorithm then compares the current total power level $P_{current}$ with a predetermined admission threshold $P_{threshold}$ minus a predetermined offset.

In case the current total power $P_{current}$ is below the predetermined admission threshold $P_{threshold}$ minus the predetermined offset, an 'increase load' algorithm is called by the 'bitrate modification' algorithm. The activated 'increase load' algorithm then attempts to increase the current load by running through a request queue in which all packet bearers desiring a higher bitrate have placed a request. The 'increase load' algorithm uses some granting criterion to determine whether or not to grant the requested bitrates. When the 'increase load' algorithm has completed its task, the 'bitrate modification' algorithm is terminated.

In case the current total power $P_{current}$ exceeds the predetermined admission threshold $P_{threshold}$ minus the predetermined offset, the 'bitrate modification' algorithm checks whether the current total power $P_{current}$ moreover exceeds the predetermined admission threshold $P_{threshold}$ by itself.

In case it is determined that the current total power $P_{current}$ is below the predetermined admission threshold $P_{threshold}$, the available resources are supposed to be utilized optimally in the radio access network, and the 'bitrate modification' algorithm is terminated.

If it is determined in contrast that the current total power $P_{current}$ exceeds the predetermined admission threshold $P_{threshold}$, a 'decrease load' algorithm is called. The activated 'decrease load' algorithm attempts to decrease the current load by decreasing the bitrates of the packet bearers until a criterion similar to the granting criterion is satisfied. When the 'decrease load' algorithm has completed its task, the 'bitrate modification' algorithm is terminated.

In a power-based packet-scheduling algorithm the granting criterion is based on estimates of the total received wideband power and the total transmitted wideband power at a base transceiver station (BTS).

The principle of any granting criterion is to estimate the impact of the proposed change (increase or decrease) on the system in order to enable the use of as much resources as possible without risking instability. Current algorithms take two approaches.

In a first, simple approach, the power level after the change is estimated based on the current load and the desired changes. The algorithms then grants capacity to the requesting radio bearers if the estimated power level is below a predetermined threshold. However, the uncertainty of such an estimate can be quite high, especially if a lot of high bitrate packet bearers are served in a cell. Especially non-realtime (NRT) services such as web-browsing have a bursty behavior, and when they go from active to inactive or inactive to active this has a great impact on the actual received or transmitted power level. Assuming that the served NRT bearers are by random inactive at the time of making a decision whether to grant resources to another bearer, the system is thus likely to become instable if some of the NRT bearers turn active right after the admission of additional radio resources to the radio bearers. The result will be a low quality of the transmissions and dropped calls. One way to avoid such situations could be to set the admission threshold to a low value, but this would mean that capacity is wasted in the average case.

In a second approach, the potential power increase for the case that all inactive NRT radio bearers become active is estimated in addition to the power level after the desired changes. Requested additional radio resources are only granted if the sum of both estimates is below some predetermined power threshold. The allocation of radio resources is thus based in this approach on a consideration of the worst case in which all inactive NRT bearers become active. Thereby, instabilities can be avoided reliably, but if the NRT radio bearers occupy a large proportion of available resources and if the activity factor is low, a lot of capacity is wasted. If the NRT radio bearers occupy e.g. 75% of the available resources and the activity factor is ⅓ active time, the-wasted capacity is 50%., This approach can be assumed to be suitable for 3G networks in the first phase after their introduction, but as soon as high-speed NRT services become popular, it will waste a lot of capacity, since the worst case is very unlikely.

SUMMARY OF THE INVENTION

It is an object of the invention to enable an improved allocation of radio resources to radio bearers of a radio access network.

This object is reached according to the invention with a method for allocating radio resources to a plurality of radio bearers in a wireless communications network, which method comprises as a first step determining for each radio bearer and/or for each set of radio bearers of at least a selected group of said radio bearers and/or of sets of said radio bearers the current activity status. A set of radio bearers can be given for example by all radio bearers of a specific radio link between the network and a mobile terminal.

In a further step, a value indicative of the probability of outage is determined based on the probability with which each radio bearer or each set of radio bearers of said selected group will change its current activity status. The term outage refers to an undesired state where the system cannot be expected to have enough resources to support all currently active users. This may be defined differently for different systems. In WCDMA, for instance, an outage event refers to the case where the total power exceeds a pre-defined threshold.

In a last step, it is decided based on a comparison of the determined value indicative of the probability of outage with a predetermined threshold value whether the current allocation of radio resources will be changed.

The object is equally reached with a module for a network element of a wireless communications network comprising means for changing the allocation of radio resources according to the proposed method. In addition, a wireless communications network is proposed which comprises such a module. Finally, the object of the invention is reached with an algorithm realizing the proposed method.

The invention proceeds from the idea that when it is known whether the probability of outage in a current situation exceeds a predetermined threshold value for this probability of outage, the resources can be increased or deceased more efficiently. A cell can be overbooked by admitting more radio bearers that could be served if they were all active at the same time. This increases the utilization of the available capacity compared to the second conventional method mentioned above. At the same time the risk of an instable system is decreased compared to the first conventional method mentioned above. In case there are e.g. many inactive NRT bearers this is considered in the computation of the probability of outage, and thus a proper safety margin can be achieved.

The value indicative of the probability of outage can be determined according to the invention in any suitable way by exploiting information about the probabilities of changes in the activity status of radio bearers or sets of radio bearers of a selected group of bearers or sets of bearers. The value indicative of the probability of outage can either consist in the probability of outage itself, or in a value in which the probability of outage has a known influence. Accordingly, the threshold value with which the value indicative of the probability of outage is compared is a threshold value for the probability of outage or some other threshold value depending on an acceptable probability of outage.

The change of the current allocation of radio resources according to the invention can consist in an increase and/or a decrease of the currently allocated resources. The radio resources allocated to the radio bearers are increased in case the comparison indicates that the probability of outage lies below a threshold value for said probability of outage.

The radio resources allocated to the radio bearers are reduced, in contrast, in case the comparison indicates that the probability of outage exceeds a threshold value for the probability of outage. The threshold value for the probability of outage indicates the allowed probability of outage and is at least included in said predetermined threshold value used for the comparison. Increasing or decreasing allocated radio resources can be achieved in particular by increasing or reducing the bitrate assigned to the different radio bearers. The predetermined threshold value can be different for increasing and decreasing the load.

The selected group of radio bearers and/or sets of radio bearers comprises advantageously all radio bearers of one cell of a wireless access network which are packet based, i.e. which may turn from active to inactive vice versa. Such packet radio bearers can be in particular, though not exclusively, NRT radio bearers.

In case the selected group of radio bearers and/or sets of radio bearers comprises NRT radio bearers, the group can comprise all NRT radio bearers or selected NRT radio bearers of the wireless communications network. The selected group may for example comprise all those NRT bearers allocated on dedicated channels (DCH). In downlink shared channel (DSCH), only the currently active NRT radio bearers are scheduled to transmit, thus a bearer cannot turn active randomly. However, the currently active bearer on a DSCH can randomly turn inactive, and moreover the situation may occur that no radio bearer has anything to transmit. This implies that also on the DSCH there is a random behavior, and therefore, the selected group may comprise NRT radio bearers allocated on the DSCH as well.

The invention can be used for allocating radio resources as well in the uplink as in the downlink. The value indicative of the probability of outage only has to be determined separately for transmitted and received signals.

The value indicative of the probability of outage can be determined based on the power employed in the wireless communications network by active radio bearers for receiving or transmitting signals. Alternatively, the value indicative of the probability of outage can be determined based on the throughput of received or transmitted data for active radio bearers.

The value indicative of the probability of outage can thus be determined for instance as the probability with which the total power of received or transmitted signals of all radio bearers in said wireless communications network will exceed a predetermined power level threshold value when taking into account the probability with which each radio bearer and/or set of radio bearers of said group of radio bearers and/or sets of radio bearers changes its current activity status within a predetermined period of time.

Equally, the value indicative of the probability of outage can be determined as the probability with which the total throughput of transmitted or received signals of all radio bearers in said wireless communications network will exceed a predetermined throughput threshold value when taking into account the probability with which each radio bearer and/or set of radio bearers of said group of radio bearers and/or sets of radio bearers changes its current activity status within a predetermined period of time.

In the two presented possibilities the value indicative of the probability of outage was determined as probability of an overload. Instead of by computing the exact probability of an overload, a value indicative of the probability of outage can also be estimated. An estimate is given by the sum of $\hat{\mu}_{total} + Q \cdot \hat{\sigma}^2_{total}$. In this sum, $\hat{\mu}_{total}$ is an expected mean power of received or transmitted signals, and $\hat{\sigma}^2_{total}$ is an expected variance of the power of received or transmitted signals. Both, $\hat{\mu}_{total}$ and $\hat{\sigma}^2_{total}$, are estimated based on the probabilities with which the radio bearers and/or sets of radio bearers of said group of radio bearers and/or sets of radio bearers will change their current activity status. Q is a fixed value selected depending on a predetermined threshold value for the probability of outage. Such an estimation is a more practicable possibility of determining a value indicative of the probability of outage, since it requires less computation power than an exact computation. It can lead to the same results, only with a lower accuracy in case the power is not distributed normally.

The same equation can be used for corresponding values for an expected mean throughput and an expected variance of the throughput of received or transmitted signals.

The possible activity states of the radio bearers or sets of radio bearers can be defined as desired. In a particular simple case, the activity states or radio bearers are restricted to two states, active and inactive. But different activity states of any number can be defined just the same.

The probability of a radio bearer or a set of radio bearers changing its-current activity status can be fixed for each possible change of said activity status, e.g. from active to inactive and vice versa, to an equal value for all radio bearers and/or all sets of radio bearers of the selected group of radio bearers and/or sets of radio bearers. Such an approach would constitute a particular simple solution. The probabilities with which a radio bearer or set of radio bearers changes its current activity status depends however on a variety of factors, which do not have to be equal for the different radio bearers or the different sets. Such a factor is for example the packet scheduling techniques used, and possibly also different kinds of services for which the radio bearers are employed. In order to obtain a more differentiated probability of a radio bearer or a set changing its current activity status, it is therefore proposed that the probability is determined for each possible change of the activity status depending on selected attributes of a radio bearer or a set or radio bearers. Alternatively, the probability can also be determined for each possible change of the activity status according to a statistical evaluation for the respective radio bearer or set or radio bearers.

In addition, the probabilities for each possible change of the activity status may change over time, which can, but does not have to, be taken account of in the determination of the probabilities.

According to the invention, the determination of a value indicative of the probability of outage is based on the probability of radio bearers changing their current activity status. An improved reliability of the determination of this value can be achieved, if it is based in addition on other factors having an influence on the probability of outage. Such factors can be for instance the probability of sudden changes in interference by other cells, or the probability of radio channel fading.

The invention is particularly, though not exclusively, suited for WCDMA radio access networks. The wireless communications network of the invention can thus be or comprise a WCDMA RAN. Especially in case combined GSM (Global System for Mobile communication) and WCDMA networks are used in which most speech calls are served on GSM and in which high-speed services are served on WCDMA, the usable capacity gained by the approach according to the invention can be significant compared to the second mentioned conventional approach.

BRIEF DESCRIPTION OF THE FIGURES

In the following, the invention is explained in more detail with reference to drawings, of which

DETAILED DESCRIPTION OF THE INVENTION

Figure 1:
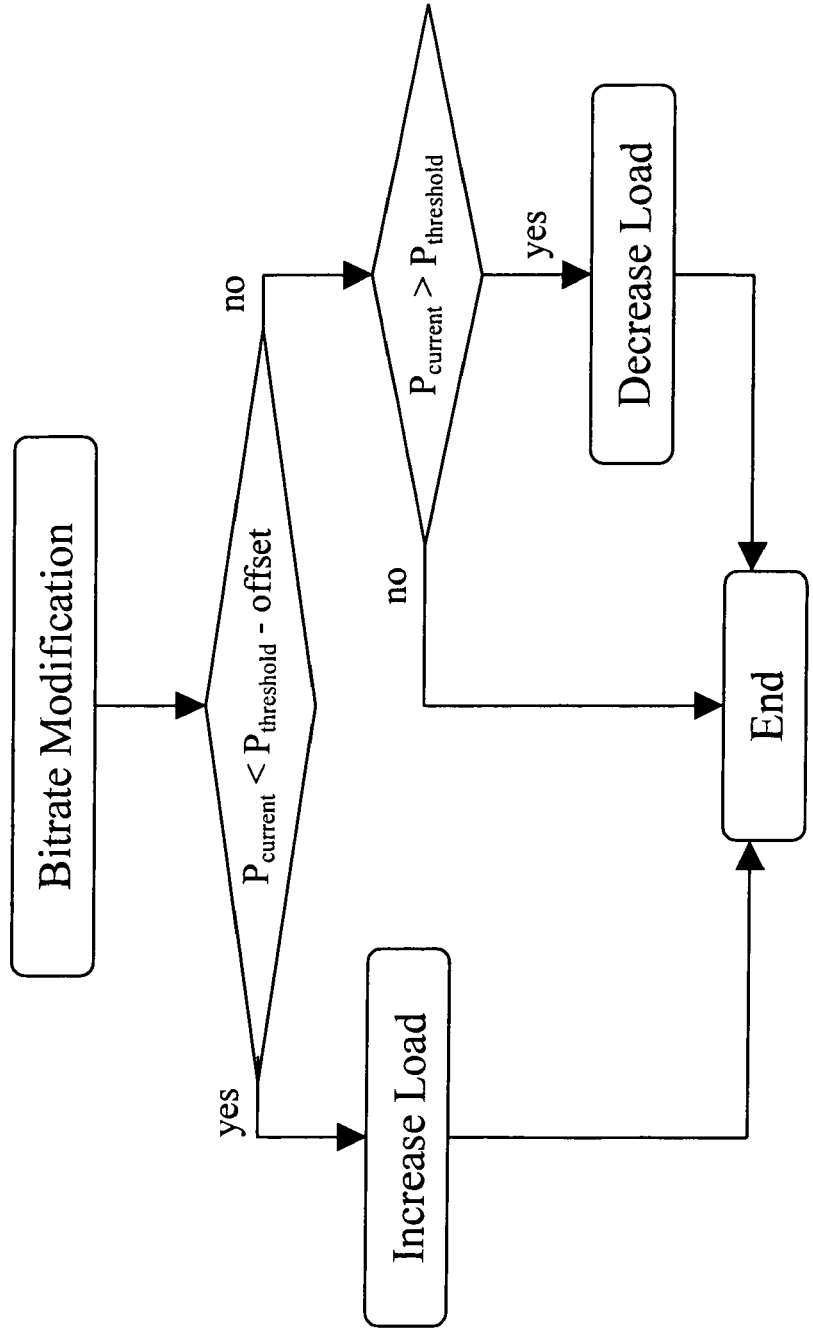
FIG. 1 is a flow chart of a bitrate modification employed in the allocation of radio resources.

The flow chart of FIG. 1 illustrating a power-based bitrate modification has already been described above.

Such a bitrate modification implemented in a PS module of a WCDMA RAN is also the basis for the exemplary embodiments of the invention that will be presented. The embodiments provide granting criterions, however, which are different from the conventional granting criterions. These granting criterions enable the 'increase load' algorithm and the decrease load, algorithm mentioned with reference to FIG. 1 to make a more differentiated decision on whether and how much the current load should be increased or decreased.

In a first embodiment of the invention the following granting criterion is used:

$$Pr(P_{total} > P_{threshold}) < P_{outage}, \qquad (1)$$

wherein the left hand term constitutes the current probability of outage. In this left hand term, $P_{total}$ is a random variable modeling the total received or transmitted wideband power, and $P_{threshold}$ is a predetermined power threshold indicating at which power level an overload is reached. The right hand term $P_{outage}$ is a predetermined threshold representing an acceptable outage probability.

If it is determined that the probability of an outage is below the predetermined probability of outage $P_{outage}$, the load is increased by granting bitrates requested by the bearers. If the probability of an outage exceeds the predetermined probability of an outage $P_{outage}$, the current load is decreased by decreasing the bitrates of the packet bearers by an amount which would make the determined and the predetermined probability of outage equal.

It will now be described how the left hand term of equation (1) can be calculated.

The probability density function (pdf) of the $P_{total}$ random variable can be described by considering some power estimate function $f(a_1, a_2, \ldots, a_n, S)$ depending on the random variables $a_i$ each modeling the activity of the NRT radio bearers and some additional paramters S describing the current state of the cell, e.g. the last power level. Each bearer can be in one of two states of activity, active or inactive. These states have Bernoulli distributions where the probabilities are either q and 1-q or p and 1-p, depending on whether the NRT bearer is currently active or inactive.

Figure 2:
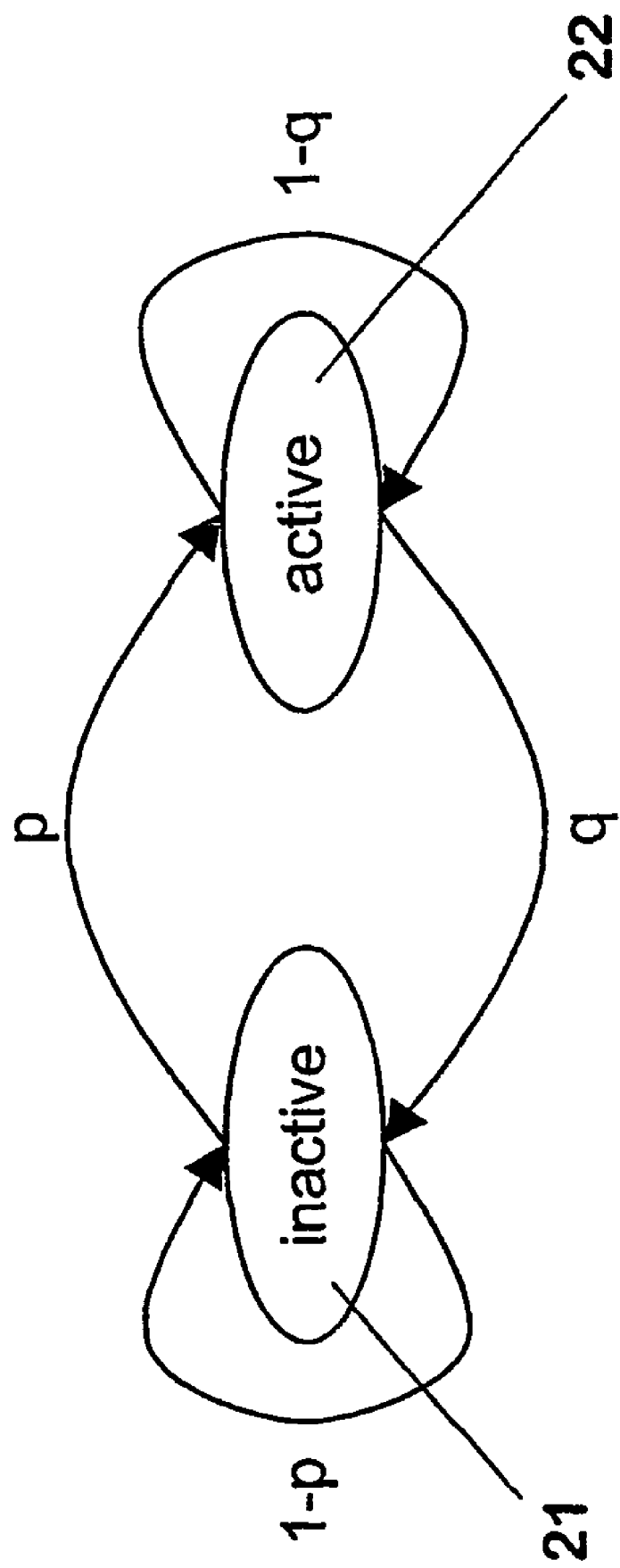
FIG. 2 is a special kind of state transition diagram for the activity status of a radio bearer where p and q may vary over time.

FIG. 2 shows a state transition diagram illustrating the different possible transition probabilities for one radio bearer. A first ellipse 21 on the left hand side of the figure represents an inactive state of an NRT bearer, while a second ellipse 22 on the right hand side of the figure represents an active state of an NRT bearer. The possible transitions between the two states are indicated by arrows. When the current state 21 of the bearer is inactive, the probability that it will become active within some selected time interval is p. When the current state 22 of the bearer is active, the probability of becoming inactive within the selected time interval is q. It may also happen that the bearer stays in its current state 21, 22. This has a probability of 1-p for a currently inactive state 21, and a probability of 1-q for a currently active state 22 of the bearer. The probabilities p and q may vary over time.

The power estimate $P_{total}$ can be considered as the sum of the current total power and an estimated change of the power. The power estimate functions $f(a_1, a_2, \ldots, a_n, S)$ are different for-uplink and downlink.

For the uplink, the power estimate is based in this embodiment on the ":Integral Method" described in: "Uplink Admission Control and Soft Capacity with MUD in CDMA", 1999, by Holma, H., Laakso, J., for determining the estimated change in the received power $\Delta \hat{P}_{rx,total}$:

$$\Delta \hat{P}_{rx,total} = \frac{\Delta \hat{\eta}}{1 - \eta_{old} - \Delta \hat{\eta}} P_{rx,total,old}, \quad (2)$$

where $\eta_{old}$ is the load fraction of the previous period, $\Delta \hat{\eta}$ is the estimated change in load fraction, and $P_{rx,total,old}$ is the total received power of the previous period.

The load fraction is defined to be:

$$\eta_{old} = \frac{P_{rx,total,old} - P_{rx,noise}}{P_{rx,total,old}}, \quad (3)$$

where $P_{rx,noise}$ is the received noise power.

The required load fraction contribution of a single active NRT bearer is:

$$\eta_i = \frac{1}{\frac{W}{\rho_i R_i} + 1}, \quad (4)$$

where W is the WCDMA system chiprate, $\rho_i$ is the required $E_b/N_0$ (ratio between the energy per useful bit and the noise power spectral density) of the $i^{th}$ bearer, and $R_i$ is the bitrate of the $i^{th}$ bearer.

From this, the $\Delta \hat{\eta}$ estimate due to NRT activity change can be produced:

$$\Delta \hat{\eta} = \sum_{i=1}^{N} \left( \frac{a_{i,new}}{\frac{W}{\rho_{i,new} R_{i,new}} + 1} - \frac{a_{i,old}}{\frac{W}{\rho_{i,old} R_{i,old}} + 1} \right), \quad (5)$$

where the activity variables $a_i$ have states 0 and 1 to model "inactive" and "active", respectively, and where N is the number of NRT bearers. The subscript label old is used to indicate a variable or measurement from the previous period, and the subscript label new is used to indicate a variable or measurement for the new, i.e. the following, period.

Now, for each configuration $(a_1, a_2, \ldots, a_N)$ of the $a_i$'s an estimated change in the receiver power $\Delta P_{rx,total}$ can be computed. Then the set of configurations $S_{grant}$ is determined in which the granting criterion holds:

$$S_{grant} = \{(a_1, a_2, \ldots, a_N) \in [0,1]^N | P_{rx,total} + \Delta \hat{P}_{rx,total}(a_1, a_2, \ldots, a_N) < P_{threshold}\}. \quad (6)$$

The probability of this set can finally be computed as the sum of the probabilities of the configurations:

$$Pr(P_{rx,total} + \Delta \hat{P}_{rx,total} < P_{threshold}) = \sum_{(a_1, a_2, \ldots, a_N) \in S_{grant}} \left( \prod_{i=1}^{N} Pr(a_i) \right). \quad (7)$$

For the downlink, the procedure is similar except that another power estimation function is used. The total transmitted power is denoted $P_{tx,total}$.

The estimated change of the current power $P_{tx,total}$ can be computed by the following equation:

$$\Delta \hat{P}_{tx,total} = \frac{\Delta \hat{A} P_{tx,total,old} + \Delta \hat{B}}{1 - A_{old} - \Delta \hat{A}}, \quad (8)$$

where the downlink "load measures" A and B are defined as:

$$A = \sum_{i=1}^{N_{active}} A_i \quad (9)$$

$$B = \sum_{i=1}^{N_{active}} B_i$$

$A_i$ and $B_i$ are individual contributions from the $i^{th}$ of all. $N_{active}$ active bearers of the cell:

$$A_i = \frac{(1 - \alpha_i)}{\frac{W}{\rho_i R_i} + (1 - \alpha_i)}, \quad (10)$$

and $$B_i = \frac{\left( \frac{P_{noise,i} + P_{other,i}}{h_i} \right)}{\frac{W}{\rho_i R_i} + (1 - \alpha_i)} = \frac{\left( \frac{P_{tx,pilot}}{\rho_{pilot,i}} - P_{tx,total} \right)}{\frac{W}{\rho_i R_i} + (1 - \alpha_i)}. \quad (11)$$

In these equations, $\alpha_i$ is the orthogonality of the $i^{th}$ bearer, $P_{noise,i}$ is the received noise power at the user equipment of the $i^{th}$ bearer, $P_{other,i}$ is the received other cell interference to the user equipment of the $i^{th}$ bearer, $h_i$ is the path loss towards the user equipment of the $i^{th}$ bearer, $P_{tx,pilot}$ is the pilot power transmitted by the BTS, and $\rho_{pilot,i}$ is the pilot power $E_c/N_0$ (ratio of energy per modulating bit to the noise spectral density) measurement in the user equipment of the $i^{th}$ bearer.

From this the $\Delta \hat{A}$ and $\Delta \hat{B}$ estimates due to NRT activity change can be obtained:

$$\Delta \hat{A} = \sum_{i=1}^{N} \left( \frac{a_{i,new}(1 - \alpha_i)}{\frac{W}{\rho_{i,new} R_{i,new}} + (1 - \alpha_i)} - \frac{a_{i,old}(1 - \alpha_i)}{\frac{W}{\rho_{i,old} R_{i,old}} + (1 - \alpha_i)} \right), \quad (12)$$

and $$\Delta \hat{B} = \sum_{i=1}^{N} \left( \frac{a_{i,new}\left( \frac{P_{tx,pilot}}{\rho_{pilot,i}} - P_{tx,total} \right)}{\frac{W}{\rho_{i,new} R_{i,new}} + (1 - \alpha_i)} - \frac{a_{i,old}\left( \frac{P_{tx,pilot}}{\rho_{pilot,i}} - P_{tx,total} \right)}{\frac{W}{\rho_{i,old} R_{i,old}} + (1 - \alpha_i)} \right), \quad (13)$$

where the used subscript labels new and old indicate again whether the respective parameter belongs to the previous or the new, following period.

Now, for each configuration $(a_1, a_2, \ldots, a_N)$ of the $a_i$'s, the estimated change in the transmitted power $\Delta \hat{P}_{tx,total}$ can be computed. Then the set of configurations $S_{grant}$ is determined in which the granting criterion holds:

$$S_{grant} = \{(a_1, a_2, \ldots, a_N) \in [0,1]^N | P_{tx,total} + \Delta \hat{P}_{tx,total}(a_1, a_2, \ldots, a_N) < P_{tx,threshold}\} \quad (14)$$

Finally, the probability of this set is computed as the sum of the probabilities of the configurations:

$$Pr(P_{tx,total} + \Delta \hat{P}_{tx,total} < P_{tx,threshold}) = \sum_{(a_1, a_2, \ldots, a_N) \in S_{grant}} \left( \prod_{i=1}^{N} Pr(a_i) \right). \quad (15)$$

Equations (7) and (15) have the disadvantage that they are not very tractable for computing the probability density function over $P_{tx,total,new}$, since they are exponential in the number of NRT bearers. Therefore, as a second embodiment of the invention an estimation is proposed which has the same outcome except some loss in accuracy and which can thus be employed instead of the exact computation of the probability $Pr(P_{total} < P_{threshold})$.

Instead of computing the exact probability of an overload $Pr(P_{total} < P_{threshold})$ the activity probabilities of the individual bearers can be used for estimating the mean $\hat{\mu}_{total}$ and variance $\hat{\sigma}^2_{total}$ of the total receiving or transmitting power for use in the following granting criterion:

$$\hat{\mu}_{total} + Q \hat{\sigma}_{total} < P_{threshold}, \quad (16)$$

wherein the term on the left in equation (16) constitutes an estimated $1 - p_{outage}$ percentile of the $P_{total}$ random variable. Q is a constant which is computed directly from a predetermined outage probability threshold $p_{outage}$. More specifically, $Q(p_{outage}) = \phi^{-1}*(1 - p_{outage})$, where $\phi^{-1}$ is the inverse of the cdf (cumulative distribution function) of a standard normal distribution. If for instance a normal distribution and an outage probability of 5% are assumed, a value Q of 1.64 would be required.

In case of normal distribution, the criterion of equation (16) is equivalent to the criterion in equation (1). Both determine whether the probability of outage is expected to be greater than a predetermined threshold value $p_{outage}$.

However, in general a normal distribution cannot be assumed. In this case, the equation (16) presents a good approximation which makes the algorithm run faster.

It will now be described in more detail how the mean $\hat{\mu}_{total}$ and the variance $\hat{\sigma}^2_{total}$ can be determined for the uplink and for the downlink based on the probabilities of the radio bearers changing their current activity state.

The mean estimate $\hat{\mu}_{rx,total}$ for the received power in the uplink can be computed from the equation:

$$\hat{\mu}_{rx,total} = P'_{rx,total} + \Delta \hat{P}_{rx,total}, \quad (17)$$

where $P'_{rx,total}$ is the latest measurement of total received power, and $\Delta \hat{P}_{rx,total}$ is the estimated change due to a modified bitrate and to radio bearers toggling between active and inactive status. $\Delta \hat{P}_{rx,total}$ is estimated by using again the above mentioned "Integral Method" with:

$$\Delta \hat{P}_{rx,total} = \frac{\Delta \hat{\eta}}{1 - \eta' - \Delta \hat{\eta}} P'_{rx,total}. \quad (18)$$

In this equation $\eta'$ is the load fraction defined as:

$$\eta' = \frac{P'_{rx,total} - P_{rx,noise}}{P'_{rx,total}}. \quad (19)$$

and $\Delta \hat{\eta}$ is the estimated load change generated as follows:

$$\Delta \hat{\eta} = \sum_{i=1}^{N_{modified}} (\eta_{i,new} - \eta_{i,old}) + \sum_{i=1}^{N_{inactive}} p_{UL} \eta_i - \sum_{i=1}^{N_{active}} q_{UL} \eta_i \quad (20)$$

In equation (20), the individual load contributions $\eta_i$ are defined from the bitrate and the required $E_b/N_0$ as follows:

$$\eta_i = \frac{1}{1 + \frac{W}{\rho_i R_i}} \quad (21)$$

where W is the WCDMA chiprate, $R_i$ is the bearer bitrate, and $\rho_i$ is the required $E_b/N_0$.

Equation (20) consist of three terms. The first term determines the load change of bearers requesting more capacity. All modified bearers are expected to be active in the following period. The second term determines the load change due to inactive users becoming active. Finally, the third term determines the load change due to active users becoming inactive, wherein active users which are treated as modified are excluded. In the second and the third term, two parameters $p_{UL}$ and $q_{UL}$ are defined to describe the probability of going from inactive to active and the other way round, respectively.

The standard deviation $\hat{\sigma}_{rx,total}$ of the received power in the uplink can be estimated by modelling the total received power random variable $P_{rx,total}$ as a constant mean $\mu_{rx,total}$ plus the random variable $\epsilon_{rx,NRT}$ modelling the uncertainty due to the current NRT bearer activity status:

$$P_{rx,total} = \mu_{rx,total} + \epsilon_{rx,NRT} \quad (22)$$

The received power variance, which will lead directly to the desired standard deviation estimate $\hat{\sigma}_{rx,NRT}$, is estimated from this equation (22) to:

$$\hat{\sigma}^2_{rx,NRT} = \hat{\mu}^2_{rx,NRT} \left( \sum_{i=1}^{N_{active}} (p_i(1-p_i)\eta_i^2) + \sum_{i=1}^{N_{inactive}} (q_i(1-q_i)\eta_i^2) \right), \quad (23)$$

where $N_{NRT}$ is the number of NRT bearers on DCH.

The mean estimate $\hat{\mu}_{tx,total}$ and standard deviation estimate $\hat{\sigma}_{tx,NRT}$ for the transmitted-power in the downlink can be computed in a similar way.

In both embodiments presented for determining an overload probability in uplink and in downlink, the two transition probabilities p and q illustrated in FIG. 2 are required for each NRT radio bearer of the RAN. These probabilities can be determined in a variety of ways with different accuracies. They can be fixed for instance to the same values for all NRT bearers of the random access network, or different probabilities p, q can be determined for each bearer based on some attributes of the bearers. Further, a time dependent statistical evaluation of the transitions can be carried out for each individual bearer.

As one example, a method will now be described for determining fixed values of p an q based on a very simple traffic model for web-browsing behavior.

The NRT traffic will be modeled as a web browsing model in this embodiment, since it is assumed that most NRT traffic will be web-browsing. This may of course change when new services are introduced, which has to be taken this into account.

Figure 3:
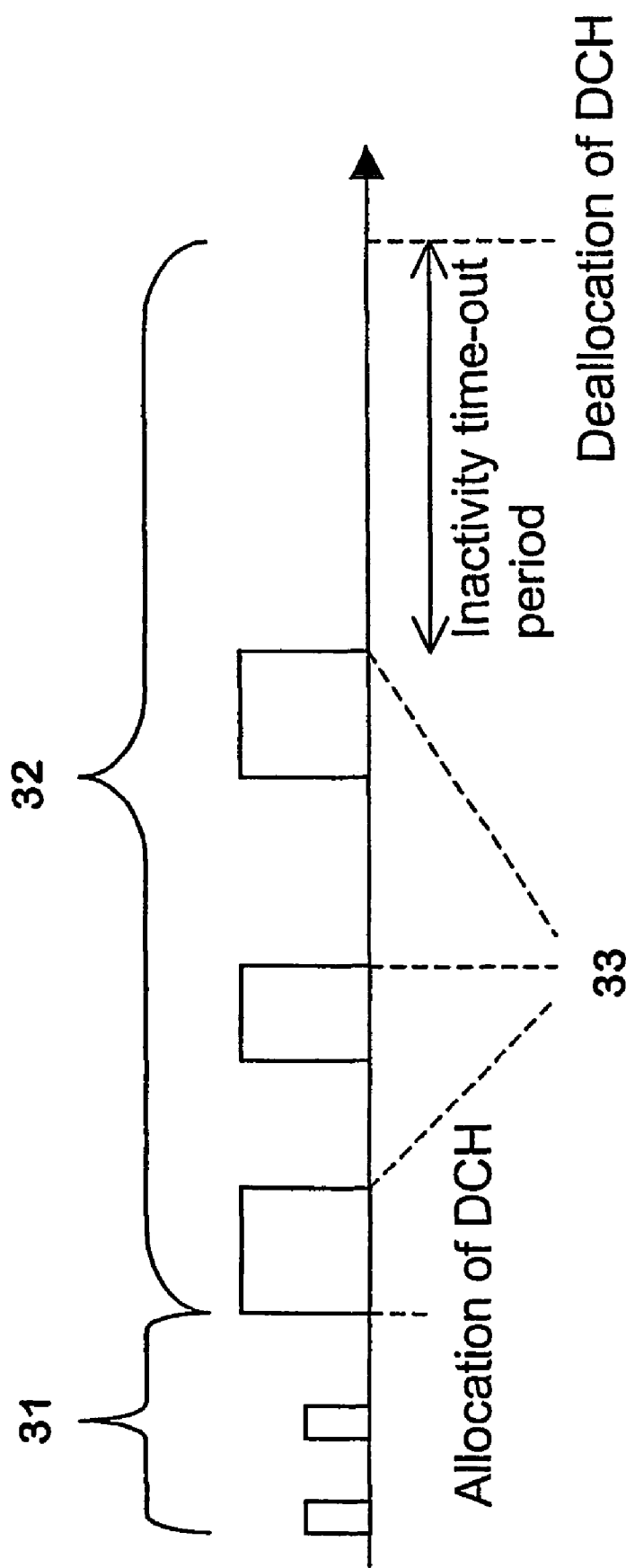
FIG. 3 illustrates the life-time of a DCH serving an NRT radio bearer.

A very simple version of web-browsing behavior is sketched in FIG. 3.

A web-browsing behavior for downlink is characterized by some initial signaling 31 including the TCP connection and an initial HTTP request. This initial signaling 31 is followed by a series 32 of packet bursts. During each burst, the employed radio bearer is in an active state, and during the periods between the bursts the bearer is in an inactive state. After each burst, an inactivity timer is set 33. The series 32 of bursts is terminated either when the connection is closed directly or when the DCH inactivity timer reaches a threshold for deallocating the DCH. The threshold is set in a range of 0 to 20 seconds. It is assumed that the initial signaling 31 is done on a CCH (Common Channel) and that as soon as transmission bursts 32 are initiated a DCH is allocated.

The TCP slow start behavior is not modeled in this embodiment. This has an impact on the setting of p and q, since the slow start means the first part 31 of the active periods in FIG. 3 would be split into a series of short bursts, and thus, the probability of changing state would be increased in this case.

If assuming as parameter values a packet call size of 25 kbytes and a reading time of 5 seconds as time between two bursts to model web-browsing traffic in downlink, estimates for p and q can be obtained.

A bitrate of 64 kbits/s corresponds with the assumed parameter values to a packet download time of around 3 seconds. Looking at a period of 100 ms, the probability of changing state from active to inactive and vice verca can now be estimated. A change from inactive to active has a probability of p=0.1 s/5 s=0.02. A change from active to inactive has a probability of q=0.1 s/3 s=0.033.

In both cases it was assumed that the average remaining time of the current active/inactive period is equal to the reading time, hence the activity change process is assumed to follow an exponential distribution. Moreover, the inactivity time-out period was not considered. Instead it was simply assumed that a deallocation of the DCH is similar to being inactive, which is the state at the time of deallocation.

For simplicity it was further assumed that using 64 kbits/s as download time is approximately applicable for all bitrates. This can be done if it is expected that the user behavior depends on the available bitrate, i.e.(if it can be expected that in case a high bitrate is available it is more likely that the user will download large files and similarly, that in case only a low bitrate is available the user will avoid heavy web-pages and files.

What is claimed is:

1. A method for allocating radio resources to a plurality of radio bearers in a wireless communications network, said method comprising:

determining for each radio bearer or for each set of radio bearers of at least a selected group of said radio bearers or of sets of said radio bearers the current activity status;

determining a value indicative of a probability of outage based on a probability with which each radio bearer or each set of radio bearers will change its current activity status;

wherein as said value indicative of the probability of outage a probability is determined with which one of the total power of received or transmitted signals respectively of all radio bearers in said wireless communications network will exceed a predetermined power level threshold value or the total throughput of transmitted or received signals respectively of all radio bearers in said wireless communications network will exceed a predetermined throughput threshold value, when taking into account the probability with which each radio bearer or set of radio bearers of said group of radio bearers or sets of radio bearers will change its current activity status within a predetermined period of time; and deciding based on a comparison of said determined value indicative of the probability of outage with a predetermined threshold value whether the current allocation of radio resources is to be changed.

2. The method according to claim 1, wherein it is decided that the radio resources allocated to the radio bearers are increased in case said comparison indicates that the probability of outage lies below a threshold value for said probability of outage.

3. The method according to claim 1, wherein it is decided that radio resources allocated to the radio bearers are reduced in case said comparison indicates that the probability of outage exceeds a threshold value for said probability of outage.

4. The method according to claim 1, wherein said wireless communications network is a cellular network, and wherein said selected group of radio bearers comprises radio bearers used in one cell of said wireless communications network.

5. The method according to claim 1, wherein said selected group of radio bearers or sets of radio bearers comprises only packet radio bearers used in said wireless communications network.

6. The method according to claim 1, wherein said selected group of radio bearers or sets of radio bearers comprises only non-realtime radio bearers used in said wireless communications network.

7. The method according to claim 1, wherein said selected group of radio bearers or sets of radio bearers comprises non-realtime radio bearers allocated on dedicated channels.

8. The method according to claim 1, wherein the selected group of radio bearers or sets of radio bearers comprises non-realtime radio bearers allocated on downlink shared channels.

9. The method according to claim 1, wherein said value indicative of the probability of outage is determined based in addition to the probability with which each radio bearer or set of radio bearers of said selected group of radio bearers or sets of radio bearers will change its current activity status on other factors having an influence on the probability of outage.

10. The method according to claim 1, wherein said activity status can be either active or inactive.

11. The method according to claim 1, wherein the probability of a radio bearer or a set of radio bearers changing its current activity status is fixed for each possible change of the activity status to an equal value for all radio bearers or sets of radio bearers of said selected group of radio bearers or sets of radio bearers.

12. The method according to claim 1, wherein the probability of a radio bearer or a set of radio bearers changing its current activity status is determined for each radio bearer or set of radio bearers of said selected group of radio bearers or sets of radio bearers depending on selected attributes of said radio bearer or said set of radio bearers.

13. The method according to claim 1, wherein the probability of a radio bearer or a set of radio bearers changing its current activity status is determined for each possible change of the activity status according to a statistical evaluation for the respective radio bearer or a set of radio bearers.

14. The method according to claim 1, wherein said wireless communications network is a wideband code division multiple access radio access network.

15. A method for allocating radio resources to a plurality of radio bearers in a wireless communications network, said method comprising:
  determining for each radio bearer or for each set of radio bearers of at least a selected group of said radio bearers or of sets of said radio bearers the current activity status;
  determinig a value indicative of a probability of outage based on a probability with which each radio bearer or each set of radio bearers will change its current activity status;
  deciding based on a comparison of said determined value indicative of the probability of outage with a predetermined threshold value whether the current allocation of radio resources is to be changed,
  wherein the sum $\hat{\mu}_{total}+Q*\hat{\sigma}^2 total$ is determined as said value indicative of the probability of outage, wherein $\hat{\mu}_{total}$ is an expected mean power of received or transmitted signals respectively, wherein $\hat{\sigma}^2_{total}$ is an expected variance of the power of received or transmitted signals respectively, $\hat{\mu}_{total}$ and $\hat{\sigma}^2_{total}$ being estimated based on the probabilities with which the radio bearers or sets of radio bearers of said selected group of radio bearers or sets of radio bearers will change their respective current activity status, and wherein Q is a fixed value selected depending on a predetermined threshold value for the probability of outage.

16. An apparatus for allocating radio resources to a plurality of radio bearers, said apparatus comprising:
  a determination component configured to determine, for each radio bearer or for each set of radio bearers of at least a selected group of said radio bearers or of sets of said radio bearers, a current activity status;
  a determination component configured to determine a value indicative of the probability of outage based on the probability with which each radio bearer or each set of radio bearers will change its current activity status;
  wherein said determination component configured to determine said value indicative of the probability of outage is configured to determine as said value indicative of the probability of outage the probability with which one of the total power of received or transmitted signals respectively of all radio bearers in said wireless communications network will exceed a predetermined power level threshold value or the total throughput of transmitted or received signals respectively of all radio bearers in said wireless communications network will exceed a predetermined throughput threshold value, when taking into account the probability with which each radio bearer or set of radio bearers of said group of radio bearers or sets of radio bearers will change its current activity status within a predetermined period of time; and
  a decision component configured to decide based on a comparison of said determined value indicative of the probability of outage with a predetermined threshold value whether the current allocation of radio resources is to be changed.

17. The apparatus according to claim 16, wherein said components belong to an algorithm implemented in said apparatus.

18. The apparatus according to claim 16, wherein said apparatus is a packet scheduling module for a wideband code division multiple access radio access network.

19. Wireless communications network comprising a network element with the apparatus according to claim 16.

20. Wireless communications network according to claim 19, which is a wideband code division multiple access radio access network.

21. The apparatus according to claim 16, wherein said determination component configured to determine said value indicative of the probability of outage is configured to determine said value indicative of the probability of outage based in addition to the probability with which each radio bearer or set of radio bearers of said selected group of radio bearers or sets of radio bearers will change its current activity status on other factors having an influence on the probability of outage.

22. The apparatus according to claim 16, wherein the probability of a radio bearer or a set of radio bearers changing its current activity status is fixed for each possible change of an activity status to an equal value for all radio bearers or sets of radio bearers of said selected group of radio bearers or sets of radio bearers.

23. The apparatus according to claim 16, further comprising a determination component configured to determine the probability of a radio bearer or a set of radio bearers changing its current activity status for each radio bearer or set of radio bearers of said selected group of radio bearers or sets of radio bearers depending on selected attributes of said radio bearer or said set of radio bearers.

24. The apparatus according to claim 16, further comprising a determination component configured to determine the probability of a radio bearer or a set of radio bearers changing its current activity status for each possible change of an activity status according to a statistical evaluation for the respective radio bearer or a set of radio bearers.

25. A computer program product comprising a program code, embodied on a computer readable medium, said program code being to perform the following:
  determining for each radio bearer or for each set of radio bearers of at least a selected group of said radio bearers or of sets of said radio bearers the current activity status:
  determining a value indicative of a probability of outage based on a probability with which each radio bearer or each set of radio bearers will change its current activity status;
  wherein as said value indicative of the probability of outage a probability is determined with which one of the total power of received or transmitted signals respectively of all radio bearers in said wireless communications network will exceed a predetermined power level threshold value or the total throughput of transmitted or received signals respectively of all radio bearers in said wireless communications network will exceed a predetermined throughput threshold value, when taking into account the probability with which each radio bearer or set of radio bearers of said group of radio bearers or sets of radio bearers will change its current activity status within a predetermined period of time; and deciding based on a comparison of said determined value indicative of the probability of outage with a predetermined threshold value whether the current allocation of radio resources is to be changed.

26. A network element comprising an apparatus according to claim 16.

27. An apparatus for allocating radio resources to a plurality of radio bearers, said apparatus comprising:

a determination component configured to determine, for each radio bearer or for each set of radio bearers of at least a selected group of said radio bearers or of sets of said radio bearers, a current activity status;

a determination component configured to determine a value indicative of the probability of outage based on the probability with which each radio bearer or each set of radio bearers will change its current activity status; and a decision component configured to decide based on a comparison of said determined value indicative of the probability of outage with a predetermined threshold value whether the current allocation of radio resources is to be changed, wherein said determination component configured to determine said value indicative of the probability of outage is configured to determine the sum $\hat{\mu}_{total}$ as said value indicative of the probability of outage, wherein $\hat{\mu}_{total}$ is an expected mean power of received or transmitted signals respectively, wherein $\hat{\sigma}^2_{total}$ is an expected variance of the power of received or transmitted signals respectively, $\hat{\mu}_{total}$ and $\hat{\sigma}^2_{total}$ being estimated based on the probabilities with which the radio bearers or sets of radio bearers of said selected group of radio bearers or sets of radio bearers will change their respective current activity status, and wherein Q is a fixed value selected depending on a predetermined threshold value for the probability of outage.

28. An apparatus for allocating radio resources to a plurality of radio bearers in a wireless communications network, said apparatus comprising:

means for determining for each radio bearer or for each set of radio bearers of at least a selected group of said radio bearers or of sets of said radio bearers the current activity status;

means for determining a value indicative of the probability of outage based on the probability with which each radio bearer or each set of radio bearers will change its current activity status, wherein as said value indicative of the probability of outage a probability is determined with which one of the total power of received or transmitted signals respectively of all radio bearers in said wireless communications network will exceed a predetermined power level threshold value or the total throughput of transmitted or received signals respectively of all radio bearers in said wireless communications network will exceed a predetermined throughput threshold value, when taking into account the probability with which each radio bearer or set of radio bearers of said group of radio bearers or sets of radio bearers will change its current activity status within a predetermined period of time; and means for deciding based on a comparison of said determined value indicative of the probability of outage with a predetermined threshold value whether the current allocation of radio resources is to be changed.

* * * * *